United States Patent [19]
Przytulski et al.

[11] Patent Number: 5,197,281
[45] Date of Patent: Mar. 30, 1993

[54] INTERSTAGE SEAL ARRANGEMENT FOR AIRFOIL STAGES OF TURBINE ENGINE COUNTERROTATING ROTORS

[75] Inventors: James C. Przytulski, Fairfield; Richard L. Horvath, Hamilton; Robert J. Corsmeier, Cincinnati, all of Ohio

[73] Assignee: General Electric Company, Cincinnati, Ohio

[21] Appl. No.: 505,120

[22] Filed: Apr. 3, 1990

[51] Int. Cl.⁵ .............................................. F02K 3/02
[52] U.S. Cl. ............................... 60/226.1; 29/889.21; 415/174.4; 60/268
[58] Field of Search ............... 415/173.1, 173.3, 173.4, 415/174.4, 174.5; 277/53, 189, 51; 29/889.21; 60/226.1, 268, 39.162

[56] References Cited

U.S. PATENT DOCUMENTS

| | | | |
|---|---|---|---|
| 2,907,595 | 10/1959 | Benson | 415/174.4 |
| 2,963,307 | 12/1960 | Bobo | 286/10 |
| 3,262,635 | 7/1966 | Simuland | 230/116 |
| 3,501,089 | 3/1970 | Alford | 415/174.4 |
| 3,529,905 | 9/1970 | Meginnis | 415/174.4 |
| 3,537,713 | 11/1970 | Matthews | 415/174.4 |
| 3,603,599 | 9/1971 | Laird | 277/53 |
| 3,836,156 | 9/1974 | Dunthorne | 415/174.4 |
| 3,846,899 | 11/1974 | Gross | 29/401 |
| 4,543,039 | 9/1985 | Ruis | 415/173.1 |
| 4,623,298 | 11/1986 | Hallinger et al. | 415/139 |
| 4,767,267 | 8/1988 | Salt | 415/174.4 |
| 4,867,639 | 9/1989 | Strangman | 415/173.4 |
| 4,979,755 | 12/1990 | Lebreton | 415/174.5 |
| 5,010,729 | 4/1991 | Adamson | 60/268 |

Primary Examiner—Richard A. Bertsch
Assistant Examiner—Michael I. Kocharou
Attorney, Agent, or Firm—Jerome C. Squillaro; Nathan D. Herkamp

[57] ABSTRACT

A gas turbine engine has outer and inner counterrotatable annular turbine rotors and pluralities of turbine blades disposed in alternating rows and mounted on and extending between the respective rotors. An interstage seal arrangement for the engine is composed of a sequence of alternating inner and outer seals. Each outer seal is disposed between an interior side of the outer rotor and outer ends of the blades in one plurality thereof being spaced radially inward at their outer ends from the outer rotor and being mounted at their inner ends to the exterior side of the inner rotor. Each inner seal is disposed between the exterior side of the inner rotor and inner ends of the blades in another plurality thereof being spaced radially outward at their inner ends from the inner rotor and being mounted at their outer ends to the interior side of the outer rotor. Each inner seal is composed of an annular honeycomb component attached to the blade inner ends and a plurality of annular seal elements or teeth mounted on the exterior side of the inner rotor and projecting radially outwardly therefrom for sealably interfacing with the honeycomb component concurrently as the outer and inner rotors counterrotate relative to one another.

6 Claims, 3 Drawing Sheets

INTERSTAGE SEAL ARRANGEMENT FOR AIRFOIL STAGES OF TURBINE ENGINE COUNTERROTATING ROTORS

CROSS-REFERENCE TO RELATED APPLICATIONS

Reference is hereby made to the following copending U.S. patent applications dealing with related subject matter and assigned to the assignee of the present invention:

1. "Counter Rotation Power Turbine" by Kenneth O. Johnson, assigned U.S. Ser. No. 071,594, filed Jul. 10, 1987, a continuation of application Ser. No. 728,466 and filed May 1, 1985, now abandoned, which was a continuation-in-part of application Ser. No. 437,923, filed Nov. 1, 1982, now abandoned.
2. "Turbine Blade Outer End Attachment Structure" by Przytulski et al., assigned U.S. Ser. No. 07/505,118 and filed concurrently herewith.
3. "Turbine Blade Inner End Attachment Structure"]by Przytulski et al., assigned U.S. Ser. No. 07/505,121 and filed concurrently herewith.

BACKGROUND OF THE INVENTION

1. Field of the Invention

The present invention relates generally to gas turbine engines and, more particularly, is concerned with an interstage seal arrangement useful between counterrotating airfoil stages of a gas turbine engine.

2. Description of the Prior Art

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which, in turn, drives the compressor. Many engines further include a second turbine, known as a power turbine, located aft of the gas generator and which extracts energy from the gas flow to drive a rotating load with variable pitch blades such as found in the propulsor of helicopters, ducted turbofan engines, and turboprop engines.

A recent improvement over the turbofan and turboprop engines is an unducted fan engine such as disclosed in the first U.S. patent application cross-referenced above. In this unducted fan engine, the power turbine includes counterrotating rotors with turbine blades defining counterrotating airfoil stages which drive in corresponding fashion unducted fan blades radially located with respect to the power turbine. The fan blades of the unducted fan engine are variable pitched blades to achieve optimum performance. During operation, fuel efficiency of the engine can be increased by varying the pitch of the blade to correspond to specific operating conditions.

Heretofore, in order to minimize engine performance losses due to leakage of pressure between airfoil stages to the outside of the flow path, labyrinth interstage seals have often been used to deter passage of air. One typical prior art interstage seal is composed of an arrangement of axially spaced circumferentially-extending seal teeth or serrations on the outer ends of the blades which rotate with the engine rotor and a honeycomb component attached to a stationary stator which interfaces with the teeth.

However, this prior art interstage seal arrangement is not suitable for use in the above-described unducted fan engine having the power turbine with counterrotating rotors since successive rows of counterrotating airfoil stages preclude attachment of the honeycomb component to a static or stationary structure. Consequently, a need exists for an interstage seal arrangement which is adapted for use with counterrotating rotors respectively having alternate rows of turbine blades moving in opposite directions.

SUMMARY OF THE INVENTION

The present invention provides an interstage seal arrangement designed to satisfy the aforementioned needs. The interstage seal arrangement of the present invention includes inner and outer seals composed of annular honeycomb components and one or more annular sealing elements or teeth. In both the inner and outer seals, advantageously the honeycomb component is always located at the interior side of either the turbine blade or the outer rotor depending on which one of the two mounting structures it is respectively attached to. Therefore, even if the attachment between the honeycomb component and the respective mounting structure should loosen or detach, centrifugal force produced by rotation will tend to force or press the honeycomb component radially outward against its respective mounting structure, holding it in place. This will serve to prevent the detached component from being propelled into the paths of the turbine blades where substantial damage to the turbine blades would likely result. Also, the interstage seal arrangement does not introduce stress concentrations into the rotors and blades.

Accordingly, the present invention is directed to an interstage seal arrangement in a gas turbine engine. The engine has outer and inner counterrotatable annular turbine rotors and first and second pluralities of turbine blades disposed in alternating rows and mounted on and extending between the respective rotors. The interstage seal arrangement comprises: (a) an annular honeycomb component attachable to the inner ends of the blades in the first plurality thereof mounted at their outer ends to an interior side of the outer rotor; (b) means for attaching the honeycomb component to the blade inner ends; and (c) at least one annular seal element mounted on an exterior side of the inner rotor and projecting radially outwardly therefrom for sealably interfacing with the honeycomb component concurrently as the outer and inner rotors counterrotate relative to one another.

More particularly, means for attaching the honeycomb component to the inner ends of the turbine blades can take one of several forms. One form is a braze joint for rigidly affixing the honeycomb component directly thereto. Another form includes a backing member, such as made of metal and composed of strip-like segments, and a slot defined in the blade inner ends into which the backing member segments slidably fit. The honeycomb component is rigidly affixed by a braze joint directly to the backing member. Bendable tabs are provided on the backing member which can be deformed to fit into notches intersecting with the slot for restraining circumferential movement of the backing member along the slot.

The present invention is also directed to an interstage seal arrangement which includes a sequence of alternating inner and outer seals. The inner seal has the above-described composition. In the outer seal, the honeycomb component is attached to the interior side of the outer rotor. Seal elements are mounted to the outer ends of the turbine blades and sealably interfaces with the honeycomb component.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
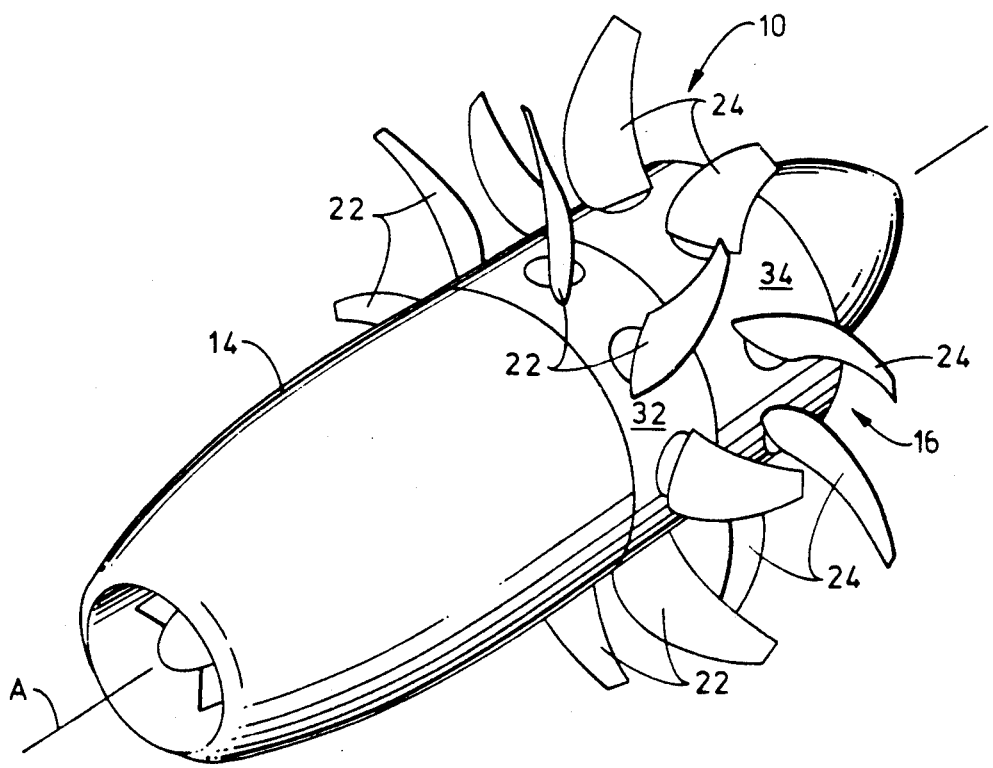
FIG. 1 is a perspective view of an unducted fan type gas turbine engine in which the interstage seal arrangement of the present invention can be employed.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 2:
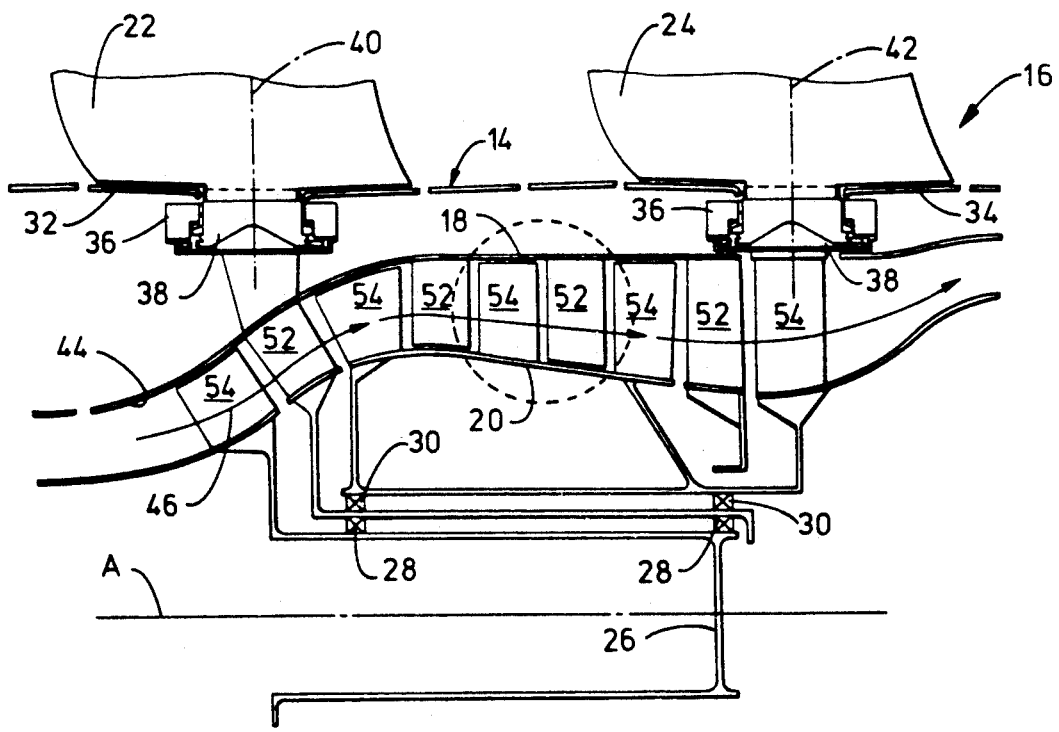
FIG. 2 is a schematic axial sectional view of a turbine section of the unducted fan engine of FIG. 1.
Figure 3:
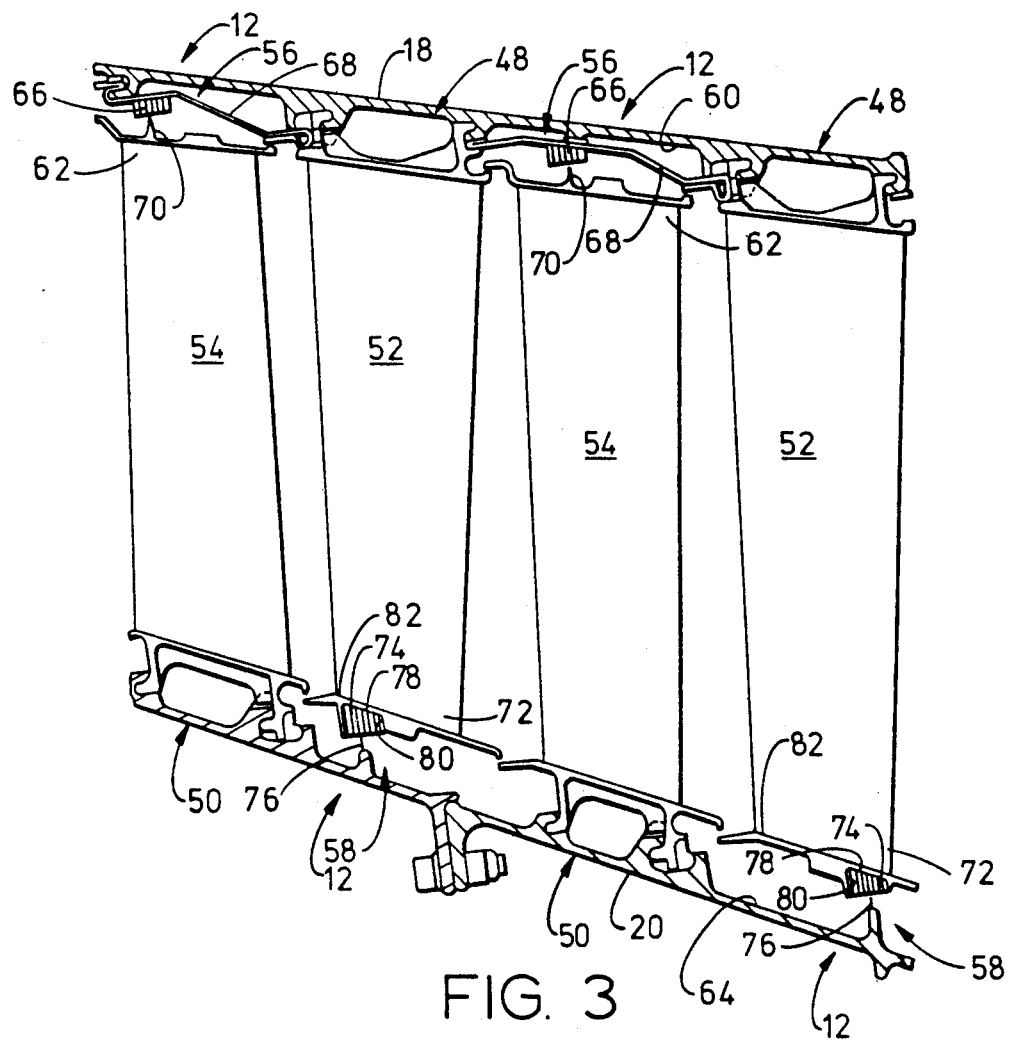
FIG. 3 is an enlarged fragmentary detailed view of the portion of the turbine section encircled in FIG. 2.

Referring now to the drawings, and particularly, to FIG. 1, there is shown a gas turbine engine 10 of the unducted fan type which incorporates the interstage seal arrangement of the present invention, generally designated 12 in FIG. 3. The engine 10 has an outer shroud or nacelle 14 which encompasses a forward gas generator (not shown) and an aft power turbine 16, illustrated schematically in FIG. 2. In a known manner, the gas generator produces combustion gases which are channeled to the power turbine 16.

The power turbine 16 includes first (or outer) and second (or inner) annular turbine rotors 18, 20 (FIG. 2) which are adapted to rotate in opposite directions, or counterrotate, about a longitudinal centerline axis A of the engine 10. The rotors 18, 20 respectively mount for rotation therewith tandemly-arranged forward and rearward sets of propulsor blades 22, 24. The first, outer rotor 18 is rotatably mounted about a hollow static structure 26 of the engine 10 by a first set of bearings 28, whereas the second, inner rotor 20 is rotatably mounted about the first rotor 18 by a second set of bearings 30.

The nacelle 14 encompasses the rotors 18, 20 with the sets of propulsor blades 22, 24 extending circumferentially and radially outward from the exterior of the nacelle 14. The nacelle 14 includes a first, or forward, sleeve 32 which is coupled to and rotatable with the forward set of propulsor blades 22, and a second, or rearward, sleeve 34 which is coupled to and rotatable with the rearward set of propulsor blades 24. The exterior configuration of the nacelle 14 provides proper air flow characteristics to optimize the performance of the propulsor blades 22, 4 and thereby of the engine 10.

To further optimize the performance of the engine 10, the pitch of the propulsor blades 22, 24 can be varied to correspond to specific operating conditions. The blades 22, 24 of the forward and rearward sets thereof are rotatably mounted by hubs 36 to the interior sides of the forward and rearward nacelle sleeves 32, 34 and coupled to pitch varying mechanisms 38 operable for rotating the blades 22, 24 about respective pitch change axes 40, 42. Attention is directed to U.S. Pat. No. 4,738,590, which to Butler and is assigned to the assignee of the present invention, for gaining a detailed understanding of the blade pitch varying mechanisms.

The aft power turbine 16 also has an annular gas flowpath 44 for receiving combustion gases from the forward gas generator (not shown) of the engine 10. The gas flowpath 44 extends between the outer and inner rotors 18, 20 of the power turbine 16 and combustion gases flow therethrough as a high energy gas stream 46. The rotors 18, 20 of the power turbine 16 respectively mount, via attachment structures 48, 50 (best seen in FIG. 3), axially spaced rows of circumferentially and radially extending turbine blades 52, 54 which alternate with one another so as to define counterrotatable airfoil stages extending across the annular gas flowpath 44. The attachment structures 48, 50 shown in FIG. 3 are merely exemplary ones of several different attachment structures which can be employed for mounting the turbine blades 52, 54 to the rotors 18, 20. These attachment structures are the subject of the second and third patent applications cross-referenced above. They need not be described in detail herein for a complete and thorough understanding of the interstage seal arrangement 12 of the present invention.

Thus, the high energy gas stream 46 flowing through the annular gas flowpath 44 between the rotors 18, 20 causes the sets of turbine blades 52, 54 to turn or move in opposite directions about circular paths, in turn, causing the respective rotors 18, 20 to counterrotate and correspondingly counterrotatably drive the sets of propulsor blades 22, 24.

Interstage Seal Arrangement of the Present Invention

In order to minimize engine performance losses due to leakage of the gas stream 46 from the flowpath 44 through spaces between the rotors 18, 20 and the adjacent ends of the blades 54, 52, the interstage seal arrangement 12 of the present invention is provided, as seen in FIG. 3. The interstage seal arrangement 12 is composed of a sequence of alternating outer and inner seals, generally designated 56, 58, respectively.

Referring to FIG. 3, in accordance with the principles of the present invention it can be seen that each of the outer seals 56 is disposed between an interior side 60 of the outer rotor 18 and an outer end 62 of each blade 54 mounted at its inner end to an exterior side 64 of the inner rotor 20. The outer ends 62 of the blades 54 on the inner rotor 20 are spaced radially inward from the interior side 60 of the outer rotor 18.

Each outer seal 56 is composed of an annular honeycomb component 66 which is attached, via a sheet metal strip 68, to the interior side 60 of the outer rotor 18. Also, the outer seal 56 includes an annular seal element or tooth 70 mounted on the outer end 62 of each blade 54 and projecting radially outward therefrom for sealably interfacing with the honeycomb component 66 in a known manner concurrently as the outer and inner rotors 18, 20 counterrotate relative to one another.

Also, in accordance with the principles of the present invention, each inner seal 58 is disposed between the exterior side 64 of the inner rotor 20 and an inner end 72 of each blade 52 mounted at its outer end to the interior side 60 of the outer rotor 18. The inner ends 72 of the blades 52 on the outer rotor 18 are spaced radially outward from the exterior side 64 of the inner rotor 20.

Each inner seal 58 is composed of an annular honeycomb component 74 which is attached to the inner end 72 of each blade 52. Also, the inner seal 58 includes an annular seal element or tooth 76 mounted on the exterior side 64 of the inner rotor 20 and projecting radially outward therefrom for sealably interfacing with the honeycomb component 74 in a known manner concurrently as the outer and inner rotors 18, 20 counterrotate relative to one another.

Figure 4:
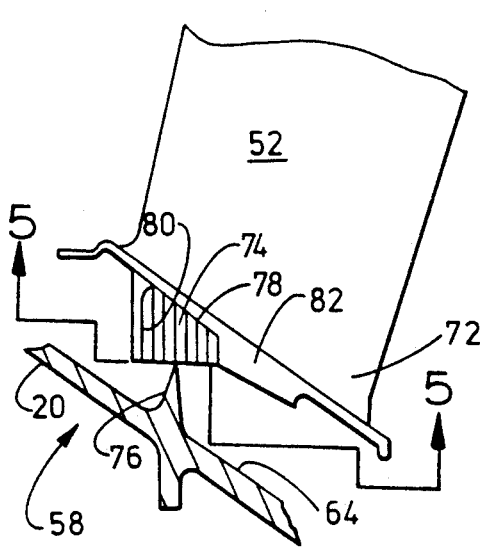
FIG. 4 is an enlarged fragmentary view of the turbine section portion of FIG. 3 illustrating one form of an inner seal of the interstage seal arrangement of the present invention.
Figure 5:
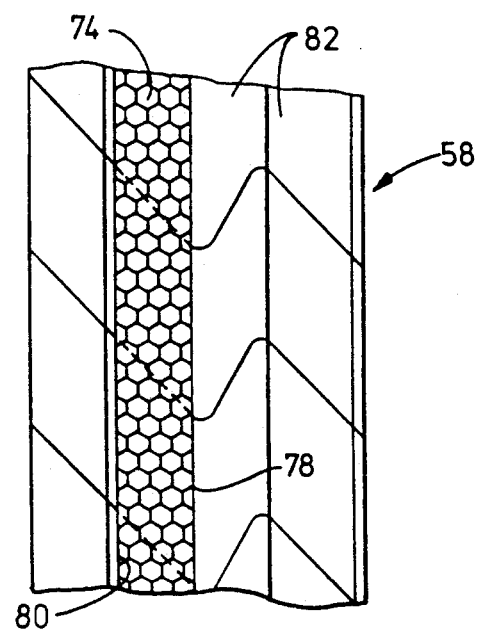
FIG. 5 is a bottom plan view of the one form of the inner seal as seen along line 5—5 of FIG. 4.

Referring to FIGS. 3-9, there are shown different forms of means for attaching the honeycomb component 74 to the blade inner ends 72 in the inner seal 58. In FIGS. 3, 4 and 5, the attaching means is a braze joint 78 rigidly affixing the honeycomb component 74 directly within a recess 80 defined in the blade tip shroud or plates 82 fixed in alignment on the blade inner ends 72. FIGS. 6-9 illustrate other forms of the attaching means. The attaching means includes a backing member 84 and a slot 86 defined in the shroud plates 82 on the blade inner ends 72. The backing member 84 is configured to slidably fit in interlocking relation within the slot 86. The honeycomb component 74 is now rigidly affixed by a braze joint 78 directly to the backing member 84. Bendable tabs 88 (only one shown) are connected to and project transversely from the backing member 84. Notches 90 (only one shown) are formed in the shroud plates 82 to intersect with the slot 86. The bendable tab 88 can be deformed to fit into notch 90 for restraining circumferential movement of the backing member 84 along the slot 86.

Figure 6:
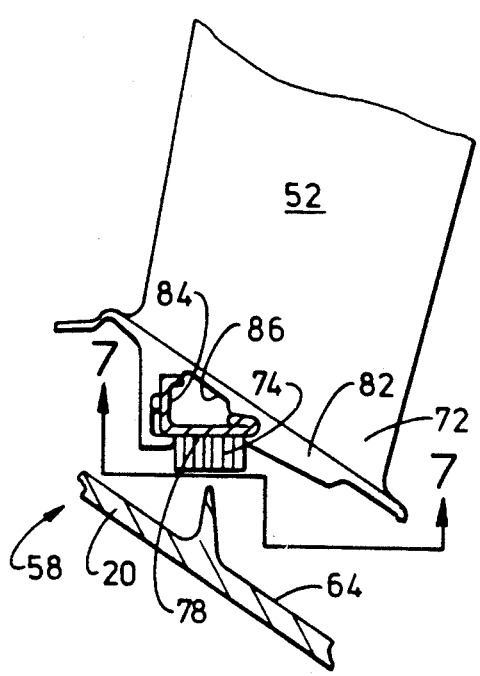
FIG. 6 is a view similar to that of FIG. 4, but showing a second form of the inner seal of the interstage seal arrangement of the present invention.
Figure 7:
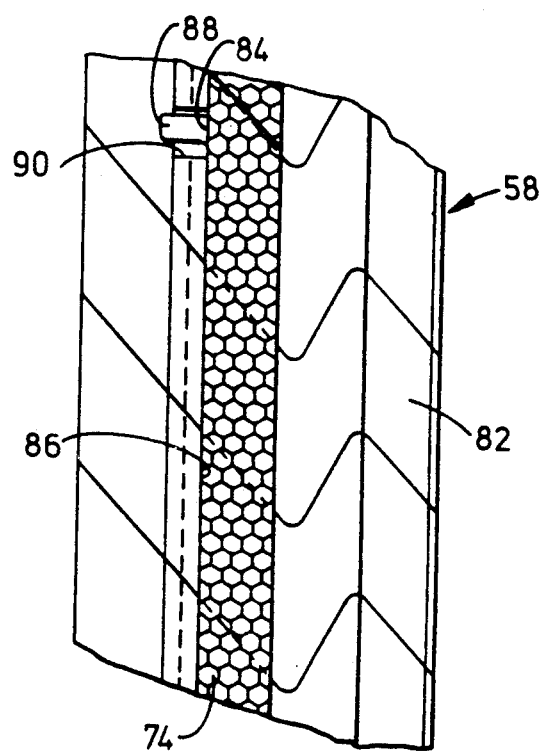
FIG. 7 is a bottom plan view of the second form of the inner seal as seen along line 7—7 of FIG. 6.
Figure 8:
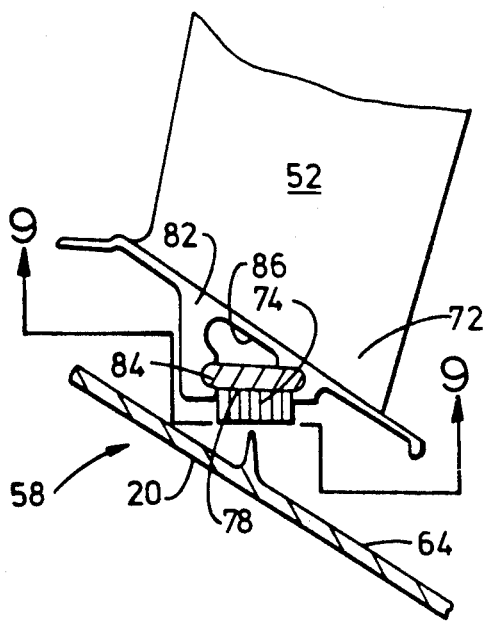
FIG. 8 is a view similar to those of FIGS. 4 and 6, but showing a third form of the inner seal of the interstage seal arrangement of the present invention.
Figure 9:
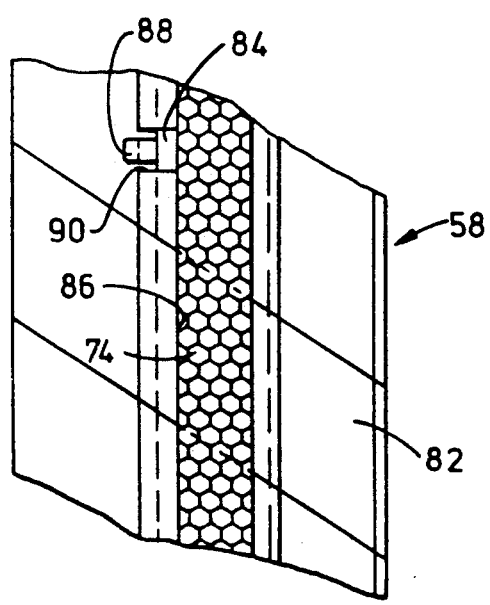
FIG. 9 is a bottom plan view of the third form of the inner seal as seen along line 9—9 of FIG. 8.

The backing member 84 in FIGS. 6 and 7 is formed by sheet metal strips, whereas in FIGS. 8 and 9 the backing member 84 is formed by narrow arcuate plates. The latter have sufficient radial height to provide a blade vibration damping mechanism. Preferably, the backing member is made of wear resistant material. Each strip or segment of the backing member 84 is inserted through the slot 86 of a group of blades 52 prior to their installation on the rotor 20. When blade end shroud Z-form interlocks are used to vibrationally dampen the blades, as seen in FIGS. 5 and 7, they do not interfere with the placement of the honeycomb components 74.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine having outer and inner counterrotatable annular turbine rotors and first and second pluralities of turbine blades disposed in alternating rows and mounted on and extending between the respective rotors, an interstage seal arrangement comprising:
   (a) an annular honeycomb components attachable to inner ends of said blades in said first plurality thereof mounted at their outer ends to an interior side of said outer rotor;
   (b) means for attaching said honeycomb component to said blade inner ends, comprising:
       an elongated backing member;
       means defining a slot in said blade inner ends into which said backing member is slidably fit in an interlocking relation;
       means defining at least one notch in said blade inner ends which intersects said slot therein; and
       at least one bendable tab connected to said backing member and being deformable to fit into said notch for restarting movement of said backing member also said slot during counterrotation of said rotors; and
   (c) at least one annular seal element mounted on an exterior side of said inner rotor and projecting radially outwardly therefrom for sealably interfacing with said honeycomb component concurrently as said outer and inner rotors counterrotate relative to one another.

2. The seal arrangement as recited in claim 1, wherein said attaching means further includes:
   a braze joint disposed between said honeycomb component and said backing member and rigidly affixing said honeycomb component thereto.

3. In a gas turbine engine having outer and inner counterrotatable annular turbine rotors defining an annular gas flowpath therebetween and respective first and second pluralities of turbine blades mounted to said rotors in axially spaced alternating rows which extend across said gas flowpath to define counterrotatable airfoil stages, an interstage seal arrangement comprising:
   (a) an inner seal disposed between an exterior said of said inner rotor and inner ends of said blades in said first plurality thereof being spaced radially outward therefrom, said blades in said first plurality thereof being mounted at outer ends thereof to an interior side of said outer rotor;
   said inner seal being composed of an annular honeycomb component composed of a plurality of segments attached to said inner ends of said blades in said first plurality thereof and at least one annular seal member mounted on said exterior side of said inner rotor and projecting radially outwardly therefrom for sealably interfacing with said honeycomb component concurrently as said outer and inner rotors counterrotate relative to one another; and
   (c) means for attaching said honeycomb component segments to said blade inner ends, comprising:
       an elongated backing member;
       means defining a slot in said blade inner ends into which said backing member is slidably fit in an interlocking relation;

means defining at least one notch in said blade inner ends which intersect said slot therein; and at least one bendable tab connected to said backing member and being deformable to fit into said notch for restraining movement of said backing member along said slot during counterrotation of said rotors.

4. The seal arrangement as recited in claim 3, wherein said attaching means further includes:

a braze joint disposed between said honeycomb component and said backing member and rigidly affixing said honeycomb component thereto.

5. In a gas turbine engine having outer and inner counterrotatable annular turbine rotors defining an annular gas flowpath therebetween and respective first and second pluralities of turbine blades mounted to said rotors in axially spaced alternating rows which extend across said gas flowpath to define counterrotatable airfoil stages, an interstage seal arrangement comprising:

(a) a sequence of alternating inner and outer seals;
(b) each of said inner seals being disposed between an exterior side of said inner rotor and inner ends of said blades in said first plurality thereof being spaced radially outward from said inner rotor, said blades in said first plurality thereof being mounted at outer ends thereof to an interior side of said outer rotor;
(c) said each inner seal being composed of an annular honeycomb component, means for attaching said honeycomb component to said inner ends of said blades in said first plurality thereof, and at least one annular seal member mounted on said exterior side of said inner rotor and projecting radially outwardly therefrom for sealably interfacing with said honeycomb component concurrently as said outer and inner rotors counterrotate relative to one another, and comprising:

an elongated backing member;
means defining a slot in said blade inner ends into which said backing member is slidably fit in an interlocking relation;
means defining at least one notch in said blade inner ends which intersects said slot therein; and
at least one bendable tab connected to said backing member and being deformable to fit into said notch for restraining movement of said backing member also said slot during counterrotation of said rotors;

(d) each of said outer seals being disposed between an interior side of said outer rotor and outer ends of said blades in said second plurality thereof being spaced radially inward from said outer rotor, said blades in said second plurality thereof being mounted at inner ends thereof so said exterior side of said inner rotor;

(e) said each outer seal being composed of an annular honeycomb component attached to said interior side of said outer rotor and at least one annular seal member mounted on said outer ends of said blades in said second plurality thereof and projecting radially outward therefrom for sealably interfacing with said honeycomb component concurrently as said outer and inner rotors counterrotate relative to one another.

6. The seal arrangement as recited in claim 5, wherein said attaching means further includes:

a braze joint disposed between said honeycomb component and said backing member and rigidly affixing said honeycomb component thereto.

* * * * *